Patented Dec. 16, 1924.

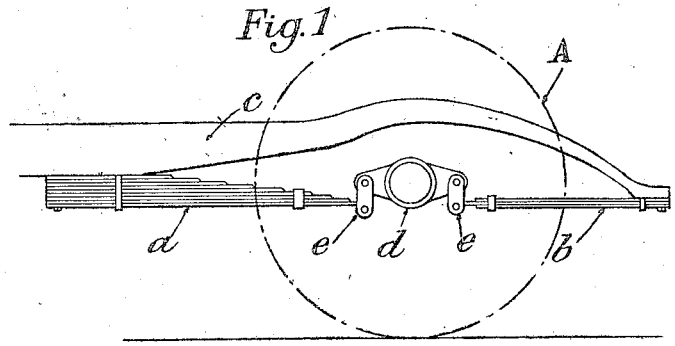
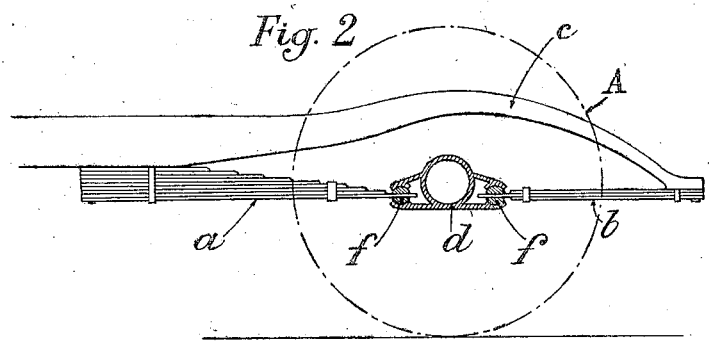
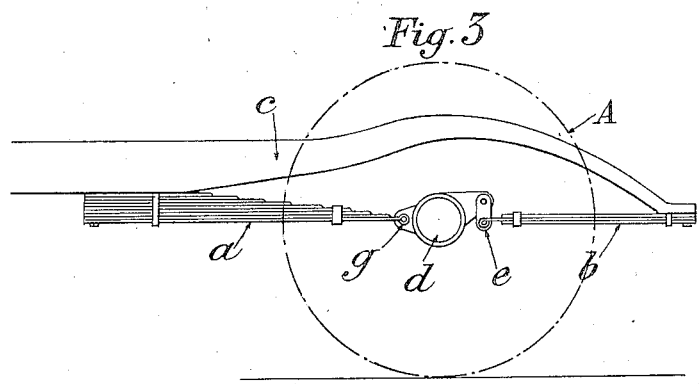

1,519,468

UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTEME CANTON-UNNÉ), OF PARIS, FRANCE.

SUSPENSION DEVICE FOR VEHICLES.

Application filed March 27, 1923. Serial No. 628,119.

*To all whom it may concern:*

Be it known that I, PIERRE JEAN RENÉ POSTEL-VINAY, citizen of the French Republic, residing at Paris, in the French Republic, have invented new and useful Improvements in Suspension Devices for Vehicles, of which the following is a specification.

The present invention relates to a suspension device particularly intended for motor vehicles, and is characterized in that it is composed of two half-springs of different strengths having their thicker ends rigidly secured to the vehicle frame and their thinner ends pivoted on the vehicle axle, the weaker half-spring being built in such a manner as to act only as a damping-spring. To this end the thicker half-spring is given during manufacture a greater initial curvature than the thinner half-spring, so that the normal static load is only supported by the said thicker half-spring while the thinner half-spring works chiefly as a damping spring subjected only to the variations in the useful load and to dynamic stresses.

In the accompanying drawing shown by way of example:

Fig. 1 is a front view of an embodiment of the suspension device according to the invention, in position on the vehicle.

Fig. 2 is a front view of a modification of the pivoting means for the thin ends of the springs.

Fig. 3 is a front view of another modification of the pivoting means.

As shown on Fig. 1, the suspension device according to the invention comprises two half-springs *a* and *b* which are designed to support a variable distribution of load during the whole or part of their oscillations. Their composition is thus different, as well as the curvature which is given to them in the manufacture. One of the half-springs is made stronger than the other, and is given during manufacture a greater curvature than the thinner half-spring.

In the example shown in the drawing, the half-spring *a* is shown stronger than the half-spring *b* and each half-spring has its thick end rigidly secured to the vehicle frame *c*, for instance by means of straps and bolts. The thin end of each half-spring *a* and *b* is attached to the axle *d*, carrying the wheels A, by the shackle *e*. The half-spring *a* is subjected to all the normal static suspension stresses, the half-spring *b* acting merely as a damping spring with respect to the half-spring *a*, the half-spring *b* working only under the influence of the variations in the useful load and under the dynamic stresses caused by the unevenness of the road, in such manner that the half-spring *b* may be withdrawn without causing any change in the relative position of the axle and of the thick half-spring *a* with respect to the vehicle frame.

The axle *d* may either be a steering or a driving axle.

The connection with the axle *d*, instead of being made by a shackle, may be made as shown in Fig. 2 by means of a cylindrical member *f*, or slide, adapted to rotate in a suitable bearing provided on the axle, the end of the spring being able to slide in the member *f*.

It may be further remarked, as shown in Fig. 3, that one of the springs *a* may be attached to the axle *d* by means of a pivoting eye piece *g*, and the other spring *b* may be attached to said axle *d* by a shackle *e* as shown in the figure, or by a sliding piece *f* or a second pivoting eye piece *g*.

All these attaching means may be placed at the same level or at different levels.

Having now described my invention what I claim as new and desire to secure by Letters Patent is:

1. In a vehicle spring suspension the combination, with the vehicle frame and an axle, of two half-springs of different strengths, the thick ends of said half-springs being rigidly secured to the vehicle frame, and their thin ends being pivoted on the axle, and the thicker half-spring being given during the manufacture a greater downward initial curvature than the thinner half-spring so that the normal static load is only supported by the said thicker half-spring, while the thinner half-spring works chiefly as a damping spring subjected only to the variations in the useful load and to dynamic stresses.

2. In a vehicle spring suspension the combination with the vehicle frame, an axle provided with bearings and cylindrical members adapted to rotate within said bearings, of two half-springs of different strengths, the thick ends of said half-springs being rigidly secured to the vehicle frame, and their thin ends being adapted to slide in the said cylindrical members, and the thicker half-spring being given during the manufacture a greater downward initial curvature than the thinner half-spring so that the normal static load is only supported by the said thicker half-spring, while the thinner half-spring works chiefly as a damping spring subjected only to the variations in the useful load and to dynamic stresses.

In testimony whereof I have signed my name to this specification.

PIERRE JEAN RENÉ POSTEL-VINAY.